United States Patent
Bianchi et al.

(10) Patent No.: US 7,811,061 B2
(45) Date of Patent: Oct. 12, 2010

(54) BLADE HAVING AN INTEGRAL CUFF, AND A ROTORCRAFT ROTOR PROVIDED WITH SUCH A BLADE

(75) Inventors: Laurent Bianchi, Marseilles (FR); Bernard Michel, Peyrolles En Provence (FR); Julien Jaume, Salon de Provence (FR); Florian Gregoire, Jujurieux (FR)

(73) Assignee: Eurocopter, Marignane (FR)

( * ) Notice: Subject to any disclaimer, the term of this patent is extended or adjusted under 35 U.S.C. 154(b) by 881 days.

(21) Appl. No.: 11/717,697

(22) Filed: Mar. 14, 2007

(65) Prior Publication Data

US 2007/0280828 A1  Dec. 6, 2007

(30) Foreign Application Priority Data

Mar. 15, 2006  (FR)  .................................. 06 02266

(51) Int. Cl.
*B64C 27/473*  (2006.01)
*B64C 11/24*  (2006.01)

(52) U.S. Cl. .................................. 416/134 A; 416/136
(58) Field of Classification Search ............. 416/134 A, 416/136, 140
See application file for complete search history.

(56) References Cited

U.S. PATENT DOCUMENTS

| | | | |
|---|---|---|---|
| 3,476,484 A | 11/1969 | Brunsch | |
| 4,304,525 A | 12/1981 | Mouille | |
| 4,592,701 A | 6/1986 | Hahn et al. | |

FOREIGN PATENT DOCUMENTS

| | | |
|---|---|---|
| EP | 0 362 117 | 4/1990 |
| GB | 909 617 | 10/1962 |

*Primary Examiner*—Edward Look
*Assistant Examiner*—Dwayne J White
(74) *Attorney, Agent, or Firm*—Young & Thompson

(57) ABSTRACT

A rotorcraft blade is provided having at least one spar and an outer covering. At the root of the blade, the spar is subdivided into at least one bottom tape and at least one top tape. The blade further includes a hollow cuff whose outer wall includes the outer covering secured to the bottom and top tapes.

21 Claims, 4 Drawing Sheets

BLADE HAVING AN INTEGRAL CUFF, AND A ROTORCRAFT ROTOR PROVIDED WITH SUCH A BLADE

The present invention relates to a blade including an integral cuff, and to the rotor of a rotorcraft on which the blade is arranged.

BACKGROUND OF THE INVENTION

A rotorcraft is provided with at least one engine that drives a main rotor for providing the aircraft with lift and even with propulsion. The rotor comprises a hub that is driven by a rotor shaft, in turn driven by the engine, and a plurality of blades are arranged on the hub.

While rotating, the blades are subjected to a torsor of forces, and consequently they are subjected to centrifugal force as well as to multiple effects due to flapping, due to drag, and due to twisting, where twisting is caused in particular by the changes in pitch that serve to change the inclination of the blades relative to the plane of the hub.

In addition, the hub generally includes a plurality of arms, that are preferably flexible in flapping, with the blades being arranged at the ends of those arms. The forces due in particular to centrifugal force are then transmitted to the non-flexible central zone of the hub.

Under such conditions, a first fastener device is known for fastening each blade to the hub that makes use of external means, in particular a sleeve. For example, it may be constituted by the configuration known to the person skilled in the art by the name "Starflex" as implemented in particular on "Ecureuil" helicopters, where the terms "Starflex" and "Ecureuil" are trademarks registered in the name of Eurocopter.

Under such circumstances, the hub has a solid and rigid central portion that is extended radially by as many arms that are flexible in flapping as there are blades, thus forming an assembly with the appearance of a star when seen from above.

At its root, each blade is rigidly secured, via its spar(s), to radially outer, first ends of two straps forming a sleeve, those straps being disposed on either side of the blade and the flexible arm. In addition, the inner, second radial ends of the two straps are secured to a laminated spherical abutment which is also secured to the flexible arm by being arranged in an opening present at the base of the flexible arm.

Consequently, the centrifugal force on each blade is taken up via the corresponding sleeve by the associated laminated spherical abutment, which transmits said force to the solid and rigid central portion of the hub.

Flapping, drag, and twisting are taken up firstly via the laminated spherical abutment, and secondly by adding a joint. The joint then comprises a self-lubricating ball joint fastened to the end of the flexible arm and secured to two viscoelastic elastomer soleplates, each connected to one of the two straps.

Although very effective, it will be understood that that first device is not necessarily optimized from an aerodynamic point of view, because of the presence of the straps which can lead to aerodynamic disturbances.

Document EP 0 448 685 discloses a second device for fastening a blade to a hub that implements external means, namely a cuff. A cuff merely constitutes a sleeve that is faired and a priori hollow. This definition for the term "cuff" is explained below.

The hub then has a passage at the base of each arm, with a laminated elastomer support secured to the hub being arranged in the passage. Similarly, the end of each arm is provided with a joint provided with an elastomer support.

Each blade is then fastened to one end of the cuff via its root, said cuff itself being secured to the joint and to the laminated elastomer support. In addition, the cuff surrounds the arm of the hub, thereby increasing the aerodynamic performance of the assembly because of the fairing of the blade-cuff assembly.

Nevertheless, since the cuff is then constituted by means on the outside of the blade, the use of a cuff requires an interface enabling the blade to be secured to the cuff.

Unfortunately, such an interface is penalizing in terms of weight. This has multiple consequences. Since the blade-and-cuff assembly is naturally heavier, the forces to which it the assembly is subjected and that are transmitted to the hub are greater, thus implying that the hub needs to be reinforced. Consequently, the hub is more voluminous and not very streamlined. It can thus be understood that the hub becomes particularly bulky, and overall the performance of the rotor is diminished.

To remedy the above drawbacks, document EP 0 085 129 discloses a third device in which the cuff is integral with the blade.

The cuff is then constituted by a casing that is rigid in twisting and that extends the casing of the blade. In addition, the cuff surrounds, without touching, a segment of the neck of the blade that is fastened to the hub of the rotor.

Consequently, the cuff forms part of the blade, in particular by being constituted by the covering thereof. It is also connected to a rod so as to be able to control the pitch of the blade.

By integrating the cuff in the blade, that third device eliminates the system for fastening the blade to the cuff that is provided in the second device, thereby achieving a corresponding overall saving in weight.

However, it is found that the cuff presents a section that is circular, or even nearly rectangular, which is not suitable for obtaining good aerodynamic performance. Similarly, the cuff is used ultimately only for transmitting twisting to the blade (controlling pitch), with the flapping, drag, and centrifugal forces being taken up by the neck segment of the blade. It can be understood that that cuff constitutes weight that is practically dead since its use is confined to controlling the pitch of the blade.

OBJECTS AND SUMMARY OF THE INVENTION

An object of the present invention is thus to propose a blade having an integral cuff, and also a rotorcraft rotor provided with such a blade, enabling the limitations of the above-mentioned rotors to be overcome so as to optimize the weight of the rotor and thus its aerodynamic and mechanical performance.

According to the invention, a rotorcraft blade is provided with at least one spar and an outer covering. The blade is remarkable in that, at the root of the blade, the spar is subdivided into at least one bottom tape and at least one top tape, the blade including a hollow and faired cuff whose outer wall is at least provided with said outer covering secured to said bottom and top tapes.

It should be observed that the bottom and top tapes are elongate structural elements made of a material that is capable of taking up forces and transmitting them to the hub of the rotorcraft rotor. The spar is then advantageously made of longitudinal and unidirectional glass fibers referred to as "roving" by the person skilled in the art.

Thus, the flapping and drag forces, and also centrifugal force, are transmitted essentially to the spar of the blade, which, as explained below, ends up by being fastened to the hub of a rotorcraft rotor. The bottom and top tapes making up the spar in the cuff are secured to said cuff by being fastened to its covering. Consequently, the cuff is necessarily a working component, and under the effect of the bottom and top tapes, it participates fully in transmitting forces by means of its own structural architecture.

This result constitutes a major technical advance, since the function of the cuff is no longer limited to transmitting a twisting force or merely acting as fairing. Its utility and its presence are thus completely justified. In addition, since the cuff is integral with the blade, there is no fastening to be provided between those two elements, thereby optimizing the weight of the assembly.

Furthermore, in order to obtain aerodynamic results that are as satisfactory as possible, the cuff is advantageously a body that is aerodynamically streamlined. In other words, the three-dimensional aerodynamic shape of said cuff provides geometrical and thus surface continuity with the three-dimensional aerodynamic shape of the blade.

As a result, seen from the outside, the blade then presents an overall appearance that is smooth, and a three-dimensional shape that is aerodynamic, enabling maximum fineness to be obtained, i.e. a maximum ratio of lift to drag. Since the cuff is streamlined so as to present an aerodynamic three-dimensional shape that matches the aerodynamic shape of the blade, the cuff and the remainder of the blade constitute a single streamlined body of drag that is minimized in order to optimize fineness, the cuff thus actively contributing to the aerodynamic performance of the blade.

Geometrically, the cuff comprises in succession a first zone at the end of the cuff that is closer to the tip of the blade, an intermediate zone, and a second zone at the end of the cuff that is further from said tip.

In a first embodiment, for sections of the bottom and top tapes each having a longitudinal dimension along the chord axis of the blade and an elevation dimension along the thickness direction of the blade, said sections of the bottom and top tapes present, in the first zone, a longitudinal dimension that is greater than their dimension in elevation, whereas, in the second zone, said sections of the bottom and top tapes have a longitudinal dimension that is less than their dimension in elevation. Consequently, the bottom and top tapes are flattened in the intermediate zone. In this way, it is possible to ensure that the intermediate or transition zone is located in the desired position. This technique is much more effective than a technique that involves twisting the fiberglass tapes, since twisting can lead to shapes and also to mechanical vibratory characteristics that are poorly reproducible from one blade to another.

In a second embodiment, the longitudinal dimension of the bottom and top tapes is greater than their dimension in elevation in the first zone, in the intermediate zone, and in the second zone. This embodiment makes it possible to preserve the physical integrity of the tapes by avoiding any flattening or twisting thereto. This embodiment is also easier to implement.

Finally, for a cuff having a plurality of bottom tapes, the cuff is advantageously provided with bottom reinforcement that surrounds at least two adjacent bottom tapes. Thus, the bottom reinforcement is constituted by a reinforcing tape that surrounds the bottom tape so as to improve the mechanical performance of the assembly, where necessary.

Similarly, for a cuff having a plurality of top tapes, the cuff is advantageously provided with top reinforcement that surrounds at least two adjacent top tapes.

The present invention also provides a rotorcraft rotor having a hub provided with a plurality of arms, a blade being arranged at a first end of each arm and being provided with at least one spar and with an outer covering. At the root of the blade, the spar is subdivided into at least one bottom tape and at least one top tape, the blade further including a hollow cuff whose outer wall is provided with said outer covering secured to said bottom and top tapes, a base of said arm being provided with a passage, and the bottom and top tapes being connected together via a support passing through the passage, said support being secured to the hub by connection means.

Advantageously, the support comprises a high platform and a low platform interconnected by a central portion secured to the connection means. Consequently, each bottom tape surrounds a pin passing through the low platform and each top tape passes round a pin passing through the high platform, the bottom tape thus being fastened to the low platform by a pin passing therethrough and the top tape thus being fastened to the high platform by another pin passing therethrough.

In the first embodiment, the bottom and top tapes are wound substantially vertically around the pins, these pins thus extending in an elevation direction, i.e. in the thickness direction of the blade.

In contrast, in a second embodiment, the bottom and top tapes are wound substantially horizontally about the pins, the pins then extending in a longitudinal direction, i.e. along the chord of the blade.

It is also appropriate to specify how the bottom and top tapes are arranged on the support secured to the hub.

In a first variant of the above embodiments and relating to said arrangement, the high and low platforms are perpendicular to said central portion, the bottom and top tapes being substantially parallel to the high and low platforms, respectively.

In a second variant of said arrangement, the high and low platforms are perpendicular to the central portion, with the bottom and top tapes presenting, relative to the low and high platforms respectively, a first angle lying in the range 5° to 15°.

In a third variant relating to said arrangement, the low and high platforms present, relative to the central portion of the support, a second angle lying substantially in the range 75° to 85°, the bottom and top tapes being substantially parallel to the low and high platforms, respectively.

Furthermore, the first end of the arm is provided with a ball joint that includes an outer ring, the ball joint being arranged inside said cuff.

Consequently, the blade is fastened to the arm of the hub via a support secured to a connection means, and also via an additional bearing point located at the first end of the arm. Thus, with the connection means preferably being constituted by a laminated abutment, the blade can move under the effects of the flapping and drag forces while continuing to be properly held to the hub.

For adjusting the pitch of the blade, a pitch control rod is secured to the support, itself fastened to the cuff. Under the action of the rod, and since the cuff is rigid in twisting, the blade tilts substantially about an axis passing through the connection means and the bearing point so as to present the desired inclination relative to the plane of the hub.

In addition, said additional bearing point is implemented in the form of a ball joint arranged inside the cuff and at the first end of the arm of the hub, being secured to the blade by fastener means.

In a first variant of the above-mentioned fastener means, the fastener means comprise at least one screw enabling the outer ring of the ball joint to be connected to a shoulder present inside the blade.

Similarly, it is possible to use a plurality of screws, e.g. four screws placed at equal distances around the circumference of the outer ring of the ball joint.

A second variant of the fastener means uses two fastener means, firstly a screw and secondly fastener means relying on friction, e.g. a flat. The outer ring of the ball joint then has a flat and is inserted inside a shoulder in the cuff, the shoulder presenting an inside shape that accurately matches the shape of the outer ring. Thus, because of friction, any turning of the blade will lead to turning of the outer ring of the ball joint.

In addition, in this variant, the outer ring is secured to a shoulder of the cuff via at least one screw.

In a third variant of the fastener means, the fastener means comprise adhesive serving to bond the outer ring to a shoulder present inside the blade.

In a fourth variant of the fastener means, the fastener means comprises a bayonet system.

BRIEF DESCRIPTION OF THE DRAWINGS

The invention and its advantages appear in greater detail from the following description which relates to preferred embodiments given without any limiting character and made with reference to the accompanying figures, in which.

MORE DETAILED DESCRIPTION

Elements that are shown in more than one figure are given the same reference in each of them.

Figure 1:
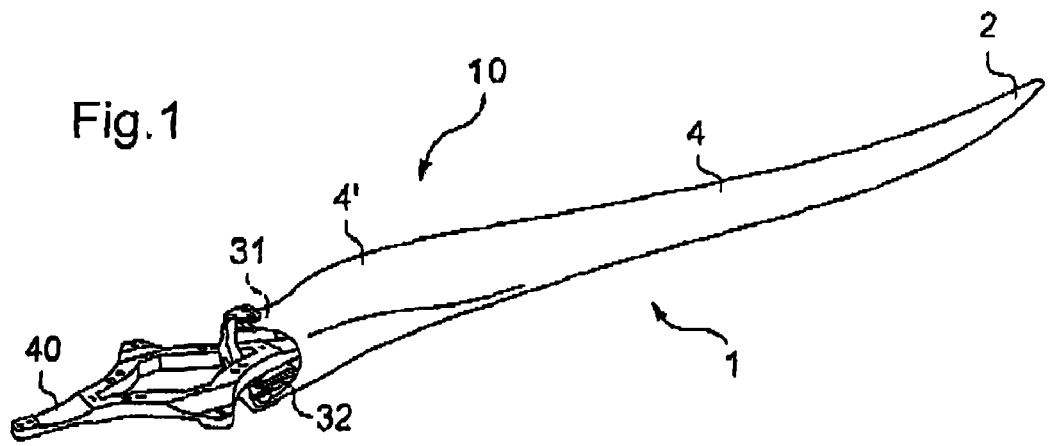
FIG. 1 is an isometric view of a blade of the invention.
Figure 2:
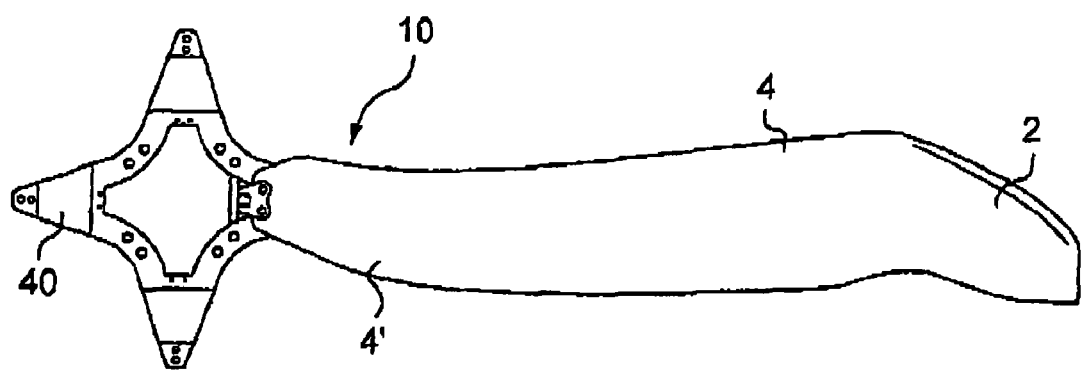
FIGS. 2 and 3 are a plan view and a rear view of such a blade.
Figure 3:
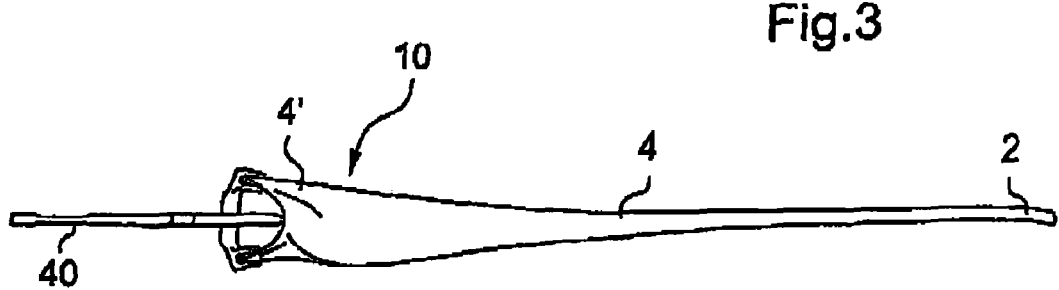

FIGS. 1, 2, and 3 are respectively an isometric view, a plan view, and a rear view of a blade 1 of the invention.

The blade 1 is provided with a tip 2 at its free end and with a cuff 10 at its root. In addition, the blade 1 is fitted along its span with at least one spar and it has an outer covering 4, 4'.

The cuff 10 is integrated in the blade 1. It is naturally hollow, its outer wall including top and bottom tapes 31 and 32 coming from the spar(s) of the blade 1 and secured to the outer covering 4'.

Consequently, the cuff 10 is constituted firstly by an outer covering 4' which thus extends the outer covering 4 of the remainder of the blade 1, and secondly by top and bottom tapes 31 and 32 that are secured to the outer covering 4' of the cuff 10 and that extend the spar(s) of the blade 1.

Consequently, the cuff 10 is a working component, i.e. because of its own structural architecture it transmits to the hub 40 for driving the blade 1 the forces that are exerted on the blade 1, and in particular forces associated with the centrifugal effect.

It can also be seen that the cuff 10 is a streamlined body, with the outer three-dimensional shape of the cuff 10 being aerodynamic and providing geometrical, and thus surface, continuity with the three-dimensional aerodynamic shape of the blade 1. This continuity can be seen particularly clearly in FIGS. 1 and 3.

Figure 4:
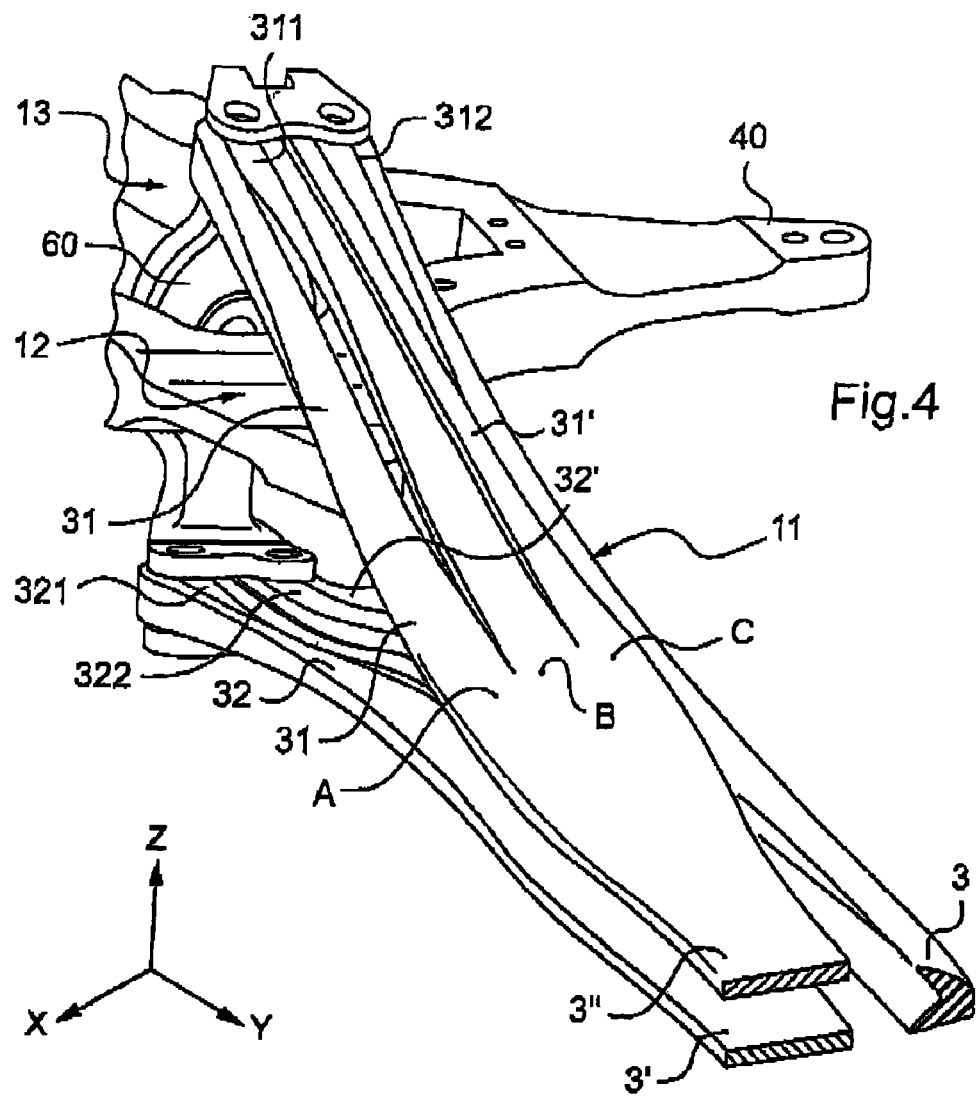
FIG. 4 is a view of the bottom and top tapes.

FIG. 4 is a detailed view of the top and bottom tapes 31 and 32 of the cuff 10.

The blade 1 has a fiberglass spar, and more precisely a main spar 3 arranged substantially at the leading edge of the blade 1, and secondary spars 3' and 3" arranged close to the pressure side and the suction side of the blade 1.

In the cuff 10, the glass fibers constituting the main spar 3, and the secondary spars 3' and 3", become redistributed between at least one bottom tape 32 and at least one top tape 31. With reference to FIG. 4, the cuff 10 has two top tapes 31, 31' and two bottom tapes 32, 32'.

A first top tape 31 extends from a point A of the secondary spar 3" situated at the suction side of the blade 1, describes a loop 311, and finally returns to the secondary spar 3" at a point B adjacent to the point A. A second top tape 31' extends from a point C of the secondary spar 3" adjacent to the point B, describes a loop 312, and finally returns to the main spar 3.

The same path is followed from the secondary spar 3' situated at the pressure side of the blade so as to obtain two bottom tapes 32 and 32' which describe two loops 321 and 322.

In addition, the cuff 10 comprises in succession, going from the tip 2 of the blade 1 towards the hub 40, a first zone 11, an intermediate zone 12, and a second zone 13.

In a first embodiment, in the first zone 11 of the sleeve, located beside the tip 2 of the blade 1, i.e. at its outer end, the top and bottom tapes 31, 31' and 32, 32' are disposed in a plane that is substantially parallel to the hub 40 on which the blade 1 is arranged. Thus, the longitudinal dimension of the sections of the bottom and top tapes 32, 32' and 31, 31', i.e. their dimension in the X direction extending along the chord of the blade, is greater than their dimension in elevation, i.e. their dimension in a Z direction extending substantially across the thickness of the blade 1.

At the opposite end, in order to secure the blade to a support 60 at the second zone 13 situated beside the hub 40, the top and bottom tapes 31, 31' and 32, 32' are disposed in a plane substantially perpendicular to the plane of the hub 40 on which the blade 1 is arranged. The bottom and top tapes 32, 32' and 31, 31' then have a longitudinal dimension that is less than their dimension in elevation.

Consequently, in the intermediate zone 12, the top and bottom tapes 31, 31' and 32, 32' are progressively flattened perpendicularly to the plane of the hub 40, their longitudinal dimension decreasing as their dimension in elevation increases, and vice versa. This operation has the result of changing the orientation of the bottom and top tapes while avoiding seeking to obtain the same result by twisting the tapes, which would be harmful.

It should be observed that in a second embodiment (not shown in a figure), the sections of the bottom and top tapes have a longitudinal dimension that is greater than their dimension in elevation, whatever the zone under consideration.

Figure 11:
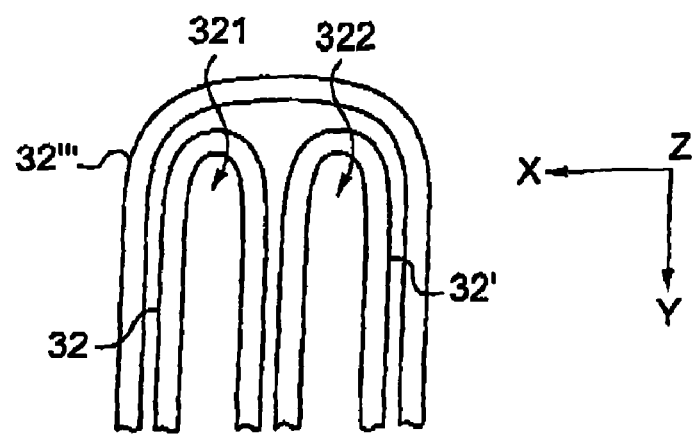
FIG. 11 is a plan view of bottom reinforcement.

Furthermore, in a variant of the first embodiment as shown in FIG. 11, the cuff has a plurality of bottom tapes 32, 32' and is advantageously provided with bottom reinforcement 32''' which surrounds at least the two adjacent bottom tapes 32, 32'.

Similarly, the cuff having a plurality of top tapes is advantageously provided with top reinforcement that surrounds at least the two adjacent top tapes.

In addition, although the present invention does indeed provide the above-described blade, it also provides a rotorcraft rotor, and in particular the hub 40 for driving the blade 1 in rotation.

Figure 6:
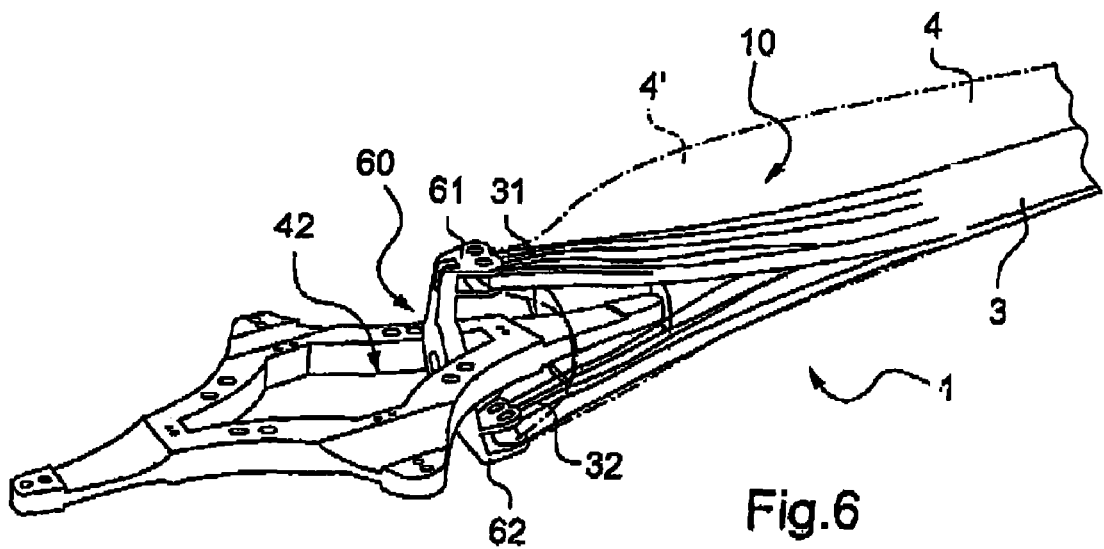
FIG. 6 is a view of the blade of the invention arranged on such a hub.
Figure 5:
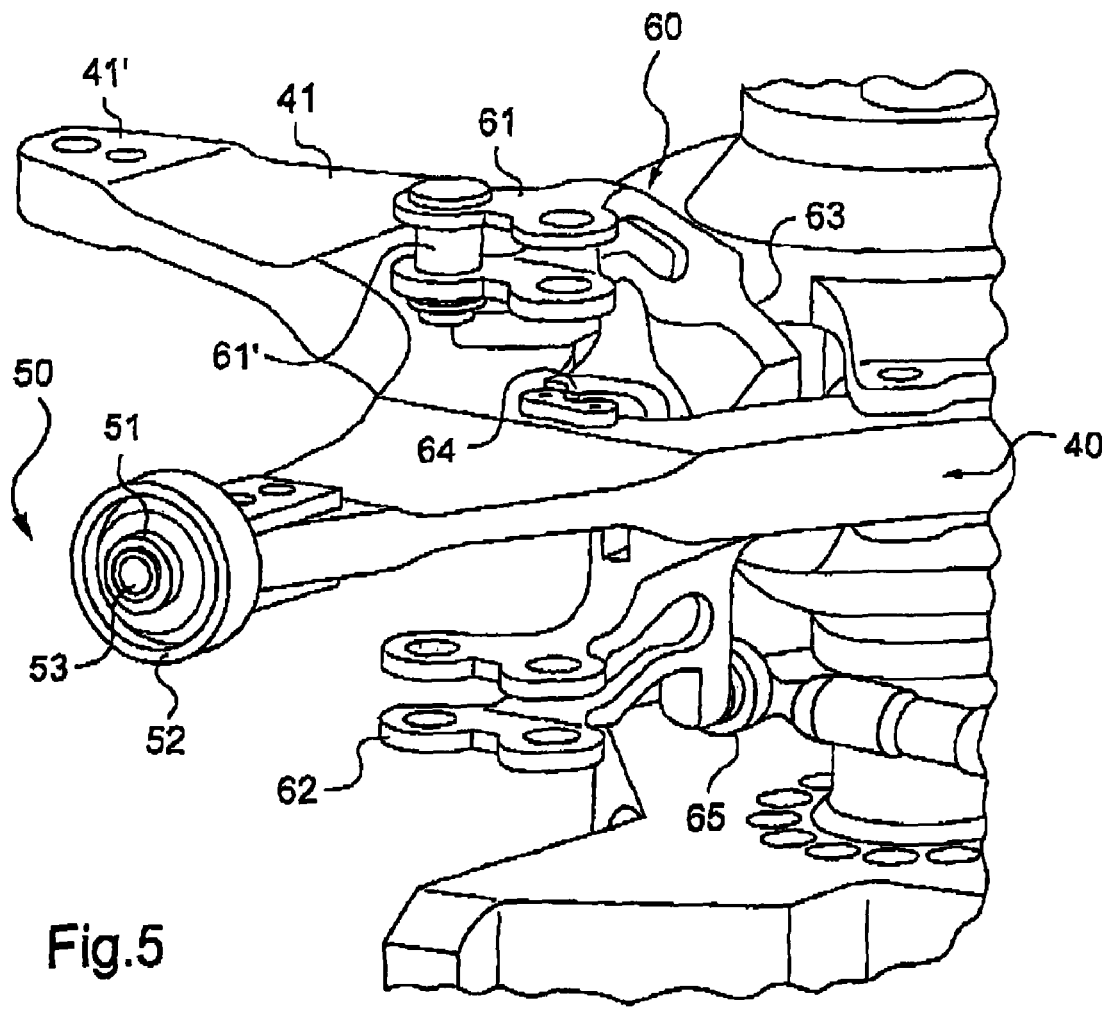
FIG. 5 is a view of a hub of the invention.

With reference to FIGS. 5 and 6, the rotorcraft rotor is thus provided with a hub 40 having a plurality of arms 41, each arm enabling a blade 1 to be installed.

Consequently, the base of an arm 41 is provided with a passage 42, and a support 60 passes through the passage 42. In addition, the support 60 comprises a high platform 61 and a low platform 62 interconnected by a central portion 63. The central portion 63 is then secured to the hub 40 via connection means, specifically a laminated spherical abutment 64.

In addition, the cuff 10 of the blade is secured to the support 60. Thus, the top and bottom tapes 31, 31' and 32, 32' are secured respectively to the high and low platforms 61 and 62, the top and bottom tapes 31, 31' and 32, 32' surrounding pins 61' that pass through the high and low platforms 61 and 62. The loops 311, 312, 321, 322 of the top and bottom tapes 31, 31' and 32, 32' then demonstrate their importance since each surrounds a pin 61' in the vicinity of the high and low platforms 61 and 62 so as to attach the cuff 10 of the blade 1 effectively to the support 60, possibly with interposition of intermediate rings that are secured to the loops 311, 312, 321, and 322. Furthermore, it is recalled that the bottom and top tapes 32, 32' and 31, 31' are secured to the outer coating 4' of the cuff and naturally to the remainder of the blade.

In order to allow the pins 61' to pass through the loops 311, 312, 321, 322, the outer covering 4' of the cuff 10 may locally include orifices. In order to avoid the presence of such an orifice, it is nevertheless possible to envisage covering the loops 311, 312, 321, and 322 of the top and bottom tapes 31, 31' and 32, 32' in part only so as to leave an opening enabling the pins 61' to be put into place.

Finally, the central portion 63 of the support 60 is secured to a pitch control rod 65, which thus continuously adjusts the pitch of the blade 1 to the appropriate value.

In conclusion, because of its arrangement on the connection means 64, the support 60 enables the blade 1 to perform movements under the effect of flapping, drag, and twisting forces, while transmitting centrifugal forces to the hub 40, the connection means 64 being rigid in compression.

Nevertheless, a single fastening point does not suffice for the blade to be fastened correctly. Consequently, the hub 40 includes an additional bearing point that serves to define the axis of rotation for pitch movements, which axis passes through the additional bearing point and the connection means 64, thus enabling pitch to be adjusted accurately by means of the control rod 65.

This bearing point is embodied by a self-lubricating ball joint 50 mounted at the first end 41' of each arm 41 of the hub 40. This ball joint 50 comprises an outer ring 52 and an inner ring 51 that is secured to the first end 41' by being held by conventional means such as a circlip or a nut 53, for example.

Since the cuff 10 of the blade 1 is hollow, the arm 41 and the ball joint 50 are located inside the cuff 10. Consequently, the ball joint 50 is secured to the blade 1 with the help of fastener means, and in fact it is secured inside the cuff 10 of the blade 1. Thus, the ball joint 50 constitutes a bearing point for the blade 1.

Depending on which variant of the invention is selected, the fastener means may comprise adhesive or at least one screw enabling the outer ring 52, optionally provided with a flat, to be connected to the ball joint 50 via a shoulder present inside the blade, or they may even comprise a bayonet system or any other equivalent means.

Furthermore, FIGS. 7 to 10 are diagrams showing how the bottom and top tapes 32, 32' and 31, 31' are arranged on the support 60, in several variants.

Figure 7:
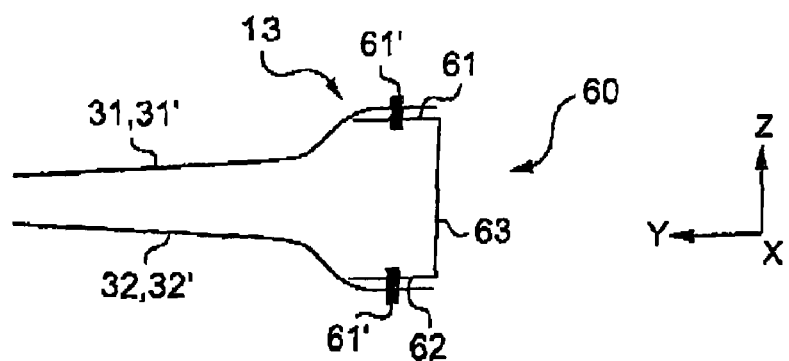
FIGS. 7 to 10 are diagrams explaining the arrangement of the bottom and top tapes on the support secured to the hub in several variants.

In a first variant of the first embodiment, shown in FIG. 7, the low and high platforms 62 and 61 are perpendicular to the central portion 63 of the support 60. In addition, in the second zone 13, the bottom and top tapes 32, 32' and 31, 31' are respectively parallel to the low and high platforms 62 and 61 in the transverse direction Y. Furthermore, the bottom and top tapes 32, 32' and 31, 31' are wound substantially vertically around the pins 61', these pins thus extending in an elevation direction Z, i.e. in the thickness direction of the blade.

Figure 8:
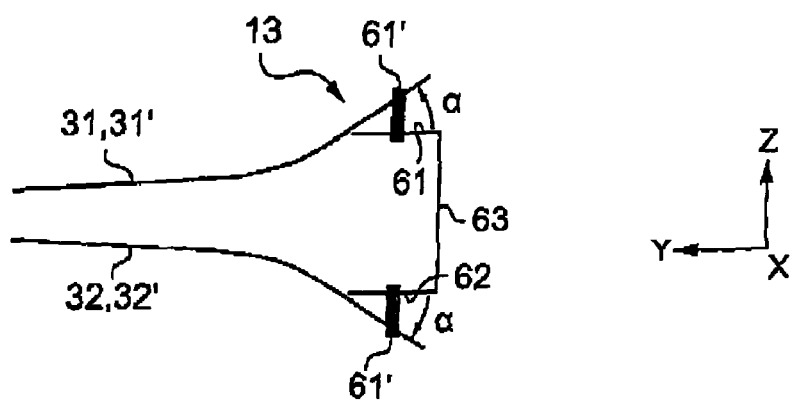

In a second variant of the first embodiment, shown in FIG. 8, the low and high platforms 62 and 61 are perpendicular to the central portion 63 of the support 60. Nevertheless, the bottom and top tapes 32, 32' and 31, 31' present, relative to the high and low platforms 62 and 61 respectively, a first angle $\alpha$ lying in the range 5° to 15°. This variant limits folding in each tape, and if necessary eliminates a zone of curvature relative to the above-described variant.

In a third variant of the first embodiment, the low and high platforms 62 and 61 present, relative to the central portion 63 of the support 60 respectively, a second angle $\beta$ substantially lying in the range 75° to 85°, the bottom and top tapes 32, 32' and 31, 31' being respectively parallel to the low and high platforms 62 and 61. This third variant presents the same advantages as the second variant, while limiting the size of the assembly comprising the blade 1 and the support 60.

Figure 9:
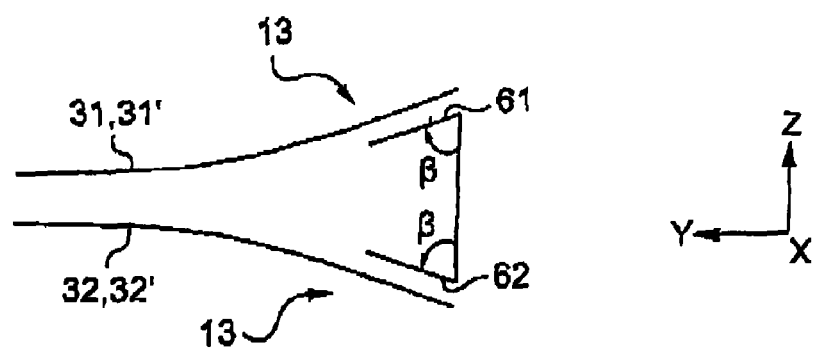

It should also be understood that the three variants shown in FIGS. 7 to 9 have bottom and top tapes arranged respectively below and above the low and high platforms. It will readily be understood that the arrangement could be different without thereby going beyond the ambit of the invention, while maintaining the values of the first and second angles $\alpha$ and $\beta$ identical, in particular if the bottom or top tapes are arranged respectively above and below the low and high platforms.

Figure 10:
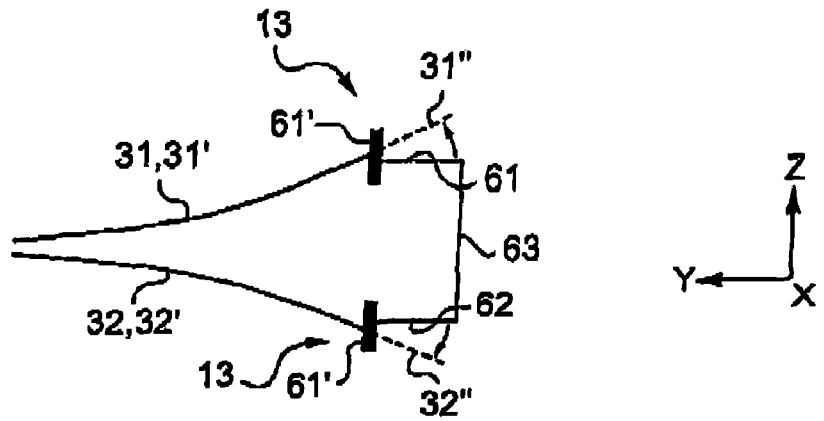

The same applies for the variant shown in FIG. 10, which corresponds to the second variant shown diagrammatically in FIG. 8.

In this example, the pins 61' are disposed at the free ends of the low and high platforms 62 and 61. Nevertheless, it can be considered that the bottom and top tapes 32, 32' and 31, 31', or rather virtual extensions 32", 31" of said tape, still present a first angle $\alpha$ lying in the range 5° to 15° relative to the low and high platforms 62 and 61.

Naturally, it will be understood that the variants shown in FIGS. 7 to 10 apply equally well to the first embodiment and to the second embodiment of the invention. Nevertheless, it should be observed that in the second embodiment (not shown in a figure), the pins 61' extend in a longitudinal direction X, i.e. in the chord direction of the blade, the winding then being made substantially horizontally.

Naturally, the present invention can be subjected to numerous variant implementations. Although several embodiments are described above, it will readily be understood that it is not possible to identify exhaustively all possible embodiments. It is naturally possible to envisage replacing any of the means described by equivalent means without going beyond the ambit of the present invention.

For example, the additional bearing point of the blade against the first end of the arm of the hub is embodied in the above-described variant by a ball joint.

However this need not be so. In another variant of the invention, the first end 41' of the arm has a Teflon finger engaged in a Teflon bearing secured to the cuff, said bearing being constituted, for example, by a Teflon ring arranged inside the cuff. This arrangement allows the blade to make the necessary movements while simplifying assembly of the blade on the hub.

What is claimed is:

1. A rotorcraft blade (1), comprising:
   at least one spar (3, 3', 3"); and
   an outer covering (4, 4'),
   wherein, at the root of said blade (1), said spar (3, 3', 3") is
   subdivided into at least one bottom tape (32, 32') and at least one top tape (31, 31'), said blade (1) including a hollow cuff (10) whose outer wall is at least provided with said outer covering (4') secured to said bottom and top tapes (32, 32'; 31, 31'), said bottom and top tapes (32, 32'; 31, 31') constituting said spar in said sleeve.

2. A blade according to claim 1, wherein said spar (3, 3', 3") is made of glass fibers.

3. A blade according to claim 1, wherein said cuff (10) is a streamlined body so as to present an aerodynamic three-dimensional shape matching the aerodynamic shape of the blade (1).

4. A blade according to claim 1, wherein, for a cuff (10) having a first zone (11) at the end of said cuff (10) closer to a tip (2) of said blade (1), an intermediate zone (12), and a second zone (13) at the end of said cuff (10) further from said tip (2), and for a section of said bottom and top tapes (32, 32'; 31, 31') having a longitudinal direction along the axis of the chord of said blade and an elevation direction in the thickness direction of said blade, said sections of said bottom and top tapes (32, 32'; 31, 31') in said first zone (11) present a longitudinal dimension greater than their elevation dimension, whereas in said second zone (13) said sections of said bottom and top tapes (32, 32'; 31, 31') present a longitudinal dimension smaller than their dimension in elevation, said bottom and top tapes (32, 32'; 31, 31') being flattened in said intermediate zone (12) so that their longitudinal dimension decreases as their elevation direction increases.

5. A blade according to claim 1, wherein said cuff (10) has a plurality of bottom tapes (32, 32'), and is provided with bottom reinforcement (32") surrounding at least two adjacent bottom tapes (32, 32').

6. A blade according to claim 1, wherein said cuff (10) has a plurality of top tapes (31, 31'), and is provided with top reinforcement surrounding at least two adjacent top tapes (31, 31').

7. A blade according to claim 1, wherein, for a cuff (10) having a first zone (11) at the end of said cuff (10) that is closer to a tip (2) of said blade (1), an intermediate zone (12), and a second zone (13) at the end of said cuff (10) that is further from said tip (2), and for said bottom and top tapes (32, 32'; 31, 31') having a section with a longitudinal direction along the chord axis of said blade and a dimension in elevation in the thickness direction of said blade, said longitudinal dimensions of the bottom and top tapes (32, 32'; 31, 31') are greater than their dimensions in elevation in the first zone, in the intermediate zone, and in the second zone.

8. A rotorcraft rotor, comprising:
   a hub (40) provided with a plurality of arms (41); and
   a blade (1) arranged at a first end (41') of each arm (41), said blade (1) being provided with at least one spar (3, 3', 3") and an outer covering (4, 4'),
   wherein, at the root of said blade, said spar is subdivided into at least one bottom tape (32, 32') and at least one top tape (31, 31'), said blade (1) having a hollow cuff (10) whose outer wall is provided with said outer covering (4') secured to said bottom and top tapes (32, 32'; 31, 31'), a base of said arm being provided with a passage (42), said bottom and top tapes (32, 32'; 31, 31') constituting said spar in said cuff, and being interconnected by a support (60) passing through said passage (42), said support (60) being secured to the hub (40) by connection means (64).

9. A rotor according to claim 8, wherein said connection means (64) is a laminated abutment (64).

10. A rotor according to claim 8, wherein said first end (41') of said arm (41) comprises a polytetrafluoroethylene finger engaged in a polytetra-fluoroethylene bearing secured to the cuff.

11. A rotor according to claim 8, wherein said first end (41') of said arm (41) is provided with a ball joint (50) including an outer ring (52), said ball joint (50) being arranged inside a sleeve (10).

12. A rotor according to claim 11, wherein said ball joint (50) is secured to said blade (1) by fastener means.

13. A rotor according to claim 12, wherein said outer ring (52) of said ball joint (50) includes a flat.

14. A rotor according to claim 12, wherein said fastener means comprises adhesive enabling said outer ring (52) to be bonded to a shoulder present inside said blade (1).

15. A rotor according to claim 12, wherein said fastener means comprises a bayonet system.

16. A rotor according to claim 8, wherein said sleeve (10) includes a second zone (13) at the end of said sleeve (10) that is further from the tip (2) of said blade, said support (60) comprising a high platform (61) and a low platform (62) interconnected by a central portion (63) secured to said connection means (64), each bottom tape (32, 32') surrounds a pin (61') passing through said low platform (62) and each top tape (31, 31') surrounds a pin (61') passing through said high platform (61).

17. A rotor according to claim 16, wherein said low and high platforms (62, 61) present, relative to said central portion, a second angle ($\beta$) lying substantially in the range 75° to 85°.

18. A rotor according to claim 17, wherein, in said second zone (13), said bottom and top tapes (32, 32'; 31, 31') are substantially parallel to said low and high platforms (62, 61) respectively.

19. A rotor according to claim 16, wherein said low and high platforms (62, 61) are perpendicular to said central portion.

20. A rotor according to claim 19, wherein, in said second zone (13), said bottom and top tapes (32, 32'; 31, 31') present, relative to said low and high platforms (62, 61) respectively, a first angle ($\alpha$) lying in the range 5° to 15°.

21. A rotor according to claim 8, wherein a pitch control rod (65) is secured to said support (60).

* * * * *